(12) United States Patent
Sanchez

(10) Patent No.: US 11,692,595 B2
(45) Date of Patent: Jul. 4, 2023

(54) COUPLING SYSTEM AND METHOD OF USE THEREOF

(71) Applicants: Hank Sanchez, Corona, CA (US); Michael Bernal, Santa Ana, CA (US)

(72) Inventor: Hank Sanchez, Corona, CA (US)

( * ) Notice: Subject to any disclaimer, the term of this patent is extended or adjusted under 35 U.S.C. 154(b) by 398 days.

(21) Appl. No.: 16/843,330

(22) Filed: Apr. 8, 2020

(65) Prior Publication Data

US 2021/0317882 A1    Oct. 14, 2021

(51) Int. Cl.
| | |
|---|---|
| *F16L 37/18* | (2006.01) |
| *F16D 23/12* | (2006.01) |
| F16D 127/04 | (2012.01) |
| F16D 125/30 | (2012.01) |

(52) U.S. Cl.
CPC ............. *F16D 23/12* (2013.01); *F16L 37/18* (2013.01); *F16D 2023/123* (2013.01); *F16D 2125/30* (2013.01); *F16D 2127/04* (2013.01); *F16L 2201/20* (2013.01)

(58) Field of Classification Search
CPC ........ F16L 37/18; F16L 37/20; F16L 2201/20
USPC ................................. 285/312, 314, 358, 394
See application file for complete search history.

(56) References Cited

U.S. PATENT DOCUMENTS

| | | | | |
|---|---|---|---|---|
| 1,261,687 A | * | 4/1918 | Brandon ................. | F16L 37/18 285/312 |
| 2,478,586 A | * | 8/1949 | Krapp ..................... | F16L 37/18 285/312 |
| 3,278,207 A | * | 10/1966 | Barish .......................... | 285/312 |
| 3,383,123 A | * | 5/1968 | Murray ................... | F16L 37/18 285/312 |
| 4,222,593 A | * | 9/1980 | Lauffenburger ........ | F16L 37/18 285/312 |
| 5,338,069 A | * | 8/1994 | McCarthy ............... | F16L 37/18 285/312 |
| 6,089,619 A | * | 7/2000 | Goda ...................... | F16L 37/18 285/312 |
| 9,970,581 B2 | * | 5/2018 | Acquistapace ......... | F16L 37/18 |

* cited by examiner

*Primary Examiner* — Zachary T Dragicevich
*Assistant Examiner* — William S. Choi
(74) *Attorney, Agent, or Firm* — Innovent Law, P.C.; Karima Gulick

(57) ABSTRACT

A coupling system having an inner tube, a collar, a circular gasket concentrically disposed between the inner tube and the collar; a pair of CAM levers structurally engageable with the collar, and a handle connecting the pair of CAM levers such that a user can single-handedly move the handle between the locked position and the unlocked position.

16 Claims, 6 Drawing Sheets

COUPLING SYSTEM AND METHOD OF USE THEREOF

BACKGROUND OF THE INVENTION

1. Field of the Invention

This invention relates to a coupling system and a coupling camlock for joining conduits together that can be produced and operated easily. More particularly, the invention relates to a coupling device, system and method useful in conduit coupling using a single handle and a streamlined device to reduce risk of foreign object damage (FOD).

2. Description of the Related Art

In markets today, there are very limited products offered for simple and streamlined coupling system based on a cam principle. While coupling systems have existed in the market, most require using multiple hands to lock and unlock and to attach conduits. In fact, most couplings in the market today also require additional hardware such as hooking elements, fasteners or similar attachment means to keep the coupling in a locked position when attaching conduits. In addition, most are made with materials which wears on the outside and can cause structural damage to components it is being attached to.

One type of coupling uses a male coupling member having an annular groove adjacent its connecting terminus. The male coupling member is received by and selectively coupled to a female coupling member that includes a pair of oppositely disposed pivotally mounted cam arms. The cam or camlock arms are manually movable between an unlocked position, in which the arms extend radially outwardly from the female coupling member, to a lock position, in which the cam arms are positioned alongside of the female coupling member. The cam arms include cam surfaces which are configured such that the radial extension of the cam surfaces vary in accordance with the position of the cam arms. When the cam arms are in an unlocked position, the cam surfaces do not extend fully into the groove of the male coupling member, and the male coupling member is axially movable out of the female coupling member. When the cam arms are in the lock position, the cam surfaces extend fully into and are pressed against the annular groove of the male coupling member, thereby securing the male and female coupling members in interlocking relationship.

Other coupling systems require the use of more than one hand to operate the diametrically opposite arms at the same time and other coupling systems require the additional use of fasteners to keep the coupling system in a locked position when attaching conduits, and removing those fasteners when unlocking the coupling system thereby removing hardware that can be easily misplaced and which can cause foreign object damage.

In general aviation and aerospace industries, foreign object debris (FOD) can cause damage that costs aircraft owners and operators millions of dollars every year. FOD is any object that does not belong in or near airplanes and, as a result, can injure personnel and damage aircrafts. Foreign object debris (FOD) includes any object found in an inappropriate location on or near an aircraft that—as a result of being in that location—can damage equipment or injure personnel. The resulting damage is estimated to cost the aerospace industry $4 billion a year. FOD includes a wide range of material, including loose hardware, pavement fragments, supplies, building materials, rocks, sand, etc. FOD is found near aircrafts, cargo aprons, taxiways, runways, and run-up pads. It causes damage through direct contact with airplanes, such as by cutting airplane tires or being ingested into engines, or as a result of being thrown by jet blast and damaging aircrafts or injuring people.

Therefore, there is a constant need to streamline maintenance and manufacturing equipment to avoid any extra hardware such as fasteners that need to be used in conjunction with coupling systems.

Another limitation of other coupling systems in the market is the multiple handles and locking/unlocking members which can cause damage to the aircraft structure when brushing against aircraft parts. In fact, most couplings in the market do not take into consideration proper clearance when the coupling systems are coupling conduits and attaching to aircrafts. This can cause damage to aircraft fuselage and/or other parts of the aircraft.

Quick disconnect couplings can be used to connect and disconnect hoses and other types of fluid conduits. One particularly advantageous type of coupling uses a male coupling member having an annular groove adjacent its connecting terminus. The male coupling member is received by and selectively coupled to a female coupling member that includes a pair of oppositely disposed pivotally mounted cam arms. The cam arms are manually movable between an unlocked position, in which the arms extend radially outwardly from the female coupling member, to a lock position, in which the cam arms are positioned alongside of the female coupling member. The cam arms include cam surfaces which are configured such that the radial extension of the cam surfaces vary in accordance with the position of the cam arms. When the cam arms are in an unlocked position, the cam surfaces do not extend fully into the groove of the male coupling member, and the male coupling member is axially movable out of the female coupling member. When the cam arms are in the lock position, the cam surfaces extend fully into and are pressed against the annular groove of the male coupling member, thereby securing the male and female coupling members in interlocking relationship.

Unless the cam arms are adequately prevented from rotation, there is a risk that they can be inadvertently rotated. Inadvertent rotation of the cam arms will uncouple the male coupling member from the female coupling member. Thus, it has been found desirable to provide mechanisms for preventing such inadvertent rotation. This mechanism includes a reciprocally movable plunger disposed in each of the cam arms. The plunger is spring biased to an extended position. When in this extended position, an inboard end of the plunger passes through a complimentary shaped hole in a retaining seat of the female coupling member, thereby preventing relative rotation between the cam arm and the female coupling member. The outboard end of the plunger is attached to a pull ring. Pulling of the ring overcomes the bias of the plunger spring and retracts the plunger into the cam arm. When the plunger is retracted, rotational movement of the cam arm to the unlocked position is permitted. Upon rotating the cam arm from the unlocked position to the locked position, an inclined surface at the tip of the plunger abuts a distal surface of the retaining seat in order to guide the plunger into the complementary shaped hole.

While plunger type locking mechanisms successfully prevent the inadvertent rotation of cam arms, they still have a number of shortcomings. One significant shortcoming relates to maintenance of these locking mechanisms. Because quick disconnect couplings are typically used at or near gasoline filling stations, they are frequently exposed to dirt, fuel, and grease. These elements easily become lodged in the interior recesses of the coupling member, including the passageway that houses the plunger. When this passageway becomes exposed to dirt and other debris, the movement of the plunger can be impeded and, thus, the device can fail to lock the cam arms. Moreover, it is often difficult to remove dirt and debris from the passageway because of its small size and because other parts of the coupling, including the plunger itself, obstruct access to the passageway. In addition to being difficult to clean and maintain, plunger type mechanisms make the disconnection of the coupling members more time consuming and difficult. To unlock the coupling members when a plunger type locking mechanism is employed, the ring attached to the plunger must first be pulled in a direction parallel with the longitudinal axis of the coupling. The pulling of the ring overcomes the bias of the plunger spring and removes the plunger from the complimentary shaped hole. When plunger is clear of the hole, the cam arms can then be rotated radially outwardly from the female coupling member. Once the cam arms are rotated to their unlocked position, the coupling members can be disconnected. Thus, two movements are required to unlock the coupling members: one movement substantially parallel to the axis of the coupling members (for removing the plunger), and one movement substantially perpendicular to the axis of the coupling members (for rotating the cam arms). These two movements are more time consuming and difficult to perform than a single continuous movement.

Another type of coupling is the plunger type locking mechanisms which can fail when the pull ring is removed or damaged. The pull ring prevents rotation of the plunger about its axis, thereby preventing the inclined surface of the plunger from being misplaced relative to the distal surface of the retaining seat when the cam arm is being pivoted to the locked position. If the pull ring is damaged or removed, the plunger may rotate about its axis, causing the inclined surface to become misaligned from the distal surface and preventing the plunger from being guided into the complementary shaped hole. This misalignment can result in the failure of the locking mechanism as well as damage to the coupling and/or the mechanism itself.

Currently, there are no useful alternatives to aerospace couplings that effectively assist aircraft manufacturers and maintenance personnel in avoiding FOD and avoiding wear and tear on aircraft parts while being easy to produce and use. In addition, there are no useful alternatives which use strong, durable and lightweight materials for the aerospace industry. As will be disclosed below, the present disclosure addresses these needs and covers a coupling device, system and method useful in conduit coupling using a single handle and a streamlined device to prevent these inconveniences and solve these issues.

SUMMARY OF THE INVENTION

In one aspect, the present disclosure is embodied as a coupling system having only a single handle such that a user can single handedly lock and unlock the coupling system in a rotational and/or up and down movement. The rotational movement of the handle secures and ensures that a conduit is able to connect/disconnect to a tube conveniently. To do so, the single handle connects a pair of CAM levers together which are in turn attached to a collar. By rotating or moving the handle, the pair of CAM levers engage the collar in an axial movement and allow the coupling system including a collar, an inner tube and a circular gasket to be compressed in a locked position and decompressed in an unlocked position of the system.

In one embodiment, the present disclosure is embodied as a coupling system adapted to connect conduit. The coupling system includes an inner tube having a generally cylindrical body, a collar having a generally tubular body, a circular gasket disposed between the inner tube and the collar, a pair of CAM levers structurally engageable with a portion of the collar. The pair of CAM levers consist of a right CAM lever and a left CAM lever structurally configured to be engageable with a respective right and left curved openings of the collar. The pair of CAM levers defined as both the left CAM lever and right CAM lever also each include an inner face with a curved protrusion defining a curved ear protruding outwardly from the inner face. Each of the curved ears of the right and left CAM levers has an ear higher end and an ear lower end axially spaced apart. A handle or single handle connects the two CAM levers. When the ears lower ends touch of abut the collar's curved openings lower ends, the coupling system is in a locked position. When the ears higher ends touch or abut the collar's curved opening higher ends, the coupling system is in an unlocked position.

In one embodiment of the present disclosure, a user can single-handedly move the handle between the locked position and the unlocked position without hitting a side of aircraft or other structures it connects to, or to which the coupling system is adapted to attach. A user can also move the handle in an up and down motion, a rotational motion or a clockwise/counterclockwise motion and change the coupling system from a locked to an unlocked position by rotating the handle thereby creating axial movement for the rest of the elements of the system, and namely, axial movement of the collar, inner tube and circular gasket.

In yet another embodiment, the collar has an inner wall defining a bore which extends axially. The bore collar is structurally adapted to receive a portion of the inner tube. The collar also includes a top end and a bottom end a neck portion on the top end extending radially outwardly, a first curved opening and a second curved opening diametrically opposite of one another on the neck portion. Both the first curved opening and the second curved opening each include a curved opening higher end and a curved opening lower end axially spaced from one another.

In one embodiment of the present disclosure, a user can single-handedly move the coupling system between the locked position and the unlocked position by rotating the handle.

In one embodiment, the present disclosure has CAM levers which further include a front end and the handle is structurally adapted to connect to the CAM levers by attaching to CAM levers front ends.

In another embodiment, the disclosure is embodied as a coupling system where the inner tube further has an outer wall and an inner wall defining a bore, and the collar includes an inner wall adapted to receive the portion of the outer wall of the inner tube. In this embodiment, the collar surrounds the inner tube and the inner tube goes through the collar. The circular gasket or o-ring is placed between the inner tube and the collar. In an axial configuration where the handle portion is located at the top end of the coupling system, the inner tube extends from below the collar and above the collar.

In another embodiment, the coupling system includes a ball and a circular opening or indentation on the inner face of the CAM levers's inner face adapted to receive and fit the ball or ball bearing. The system also includes a circular indentation or opening disposed on the neck portion of the collar adapted to receive and fit the ball. When the coupling system is in the unlocked position, the ball is positioned within the circular opening disposed on the CAM lever's inner face. When the coupling system is in the locked position, the ball is positioned within the circular indentation and opening of the neck portion of the collar.

In one embodiment of the present disclosure, when the user moves the handle or rotates the pair of knobs to switch between the unlocked position and the locked position, the ball moves from the circular opening on the inner face of the CAM levers and move to and rests on the circular indentation disposed on the neck portion of the collar. When the ball moves from the opening in the inner face of the CAM levers to the circular opening of the collar, the system and the ball emit an auditory click confirming that the system is in the locked position.

In another embodiment of the present disclosure, in addition to having a ball and a circular opening or indentation on the inner face of the CAM levers's inner face adapted to receive and fit the ball or ball bearing, a circular indentation or opening disposed on the neck portion of the collar adapted to receive and fit the ball, the system also includes a resistance spring and/or a pin. The resistance spring is adapted to fit inside the circular opening or indentation on the inner face of the CAM levers and offers resistance to the ball or ball bearing. In this embodiment, the spring is positioned inside the opening and is located below the ball when the ball is in the unlocked position and inside the CAM levers openings. When the coupling system is in the unlocked position, the ball is positioned within the circular opening disposed on the CAM lever's inner face. When the coupling system is in the locked position, the ball is positioned within the circular indentation and opening of the neck portion of the collar.

In the embodiment where the system includes both a resistance spring and a pin, the collar also includes an indentation on the neck of the collar adapted to fit the pin. In this particular embodiment, when the user moves the handle to switch between the unlocked position and the locked position, the ball moves from the circular opening on the inner face of the CAM levers, rides over the pin on the collar and moves to and rests on the circular indentation disposed on the neck portion of the collar. When the ball moves from the opening in the inner face of the CAM levers to the circular opening of the collar and over the pin, the system and the ball emit an auditory click confirming that the system is in the locked position.

In one embodiment, the circular gasket of the coupling system is an O-ring, a loop of elastomer or other types of gaskets.

In another embodiment of the present disclosure, the handle is either formed of one solid component, or multiple subparts attached together to form a single handle. In some embodiments, the handle includes a plurality of side openings. In a particular embodiment where the handle includes a plurality of openings such as a where multiple handle subparts are connected together, the system further includes caps structurally configured to cover the plurality of side openings. This is to reduce the risk of FOD.

In yet another embodiment of the present disclosure, the CAM levers include one or more a side openings for where the CAM levers attach to the rest of the system such as where the CAM levers attach to the collar and/or the handle. In a particular embodiment where the CAM levers, the system further includes caps structurally configured to cover the one or more side openings. This is to reduce the risk of FOD.

In one embodiment of the present invention, the first curved opening and the second curved opening on the collar's neck portion also have bushings, bearings and/or sleeves to minimize a tear and a wear on the collar. In yet another embodiment, the collar also includes a top end having a top end diameter and a lower end having a lower end diameter and/or a depression on the lower end and has a lower end diameter smaller than the top end diameter.

In another embodiment, the inner tube of the coupling system includes a top end and a lower end, a skirt disposed on the lower end extending radially outwardly, and an inner wall defining a bore adapted for passage of a fluid such as a cooling fluid or other aircraft maintenance fluids. In another embodiment the inner tube, the collar and the handle all form a continuous design and a flush design.

In one embodiment, the inner tube, the collar and/or the handle are formed with a high density polyethylene HDPE, or an HDPE injection molding. HDPE being a more durable, resistant, strong, resistant to moisture absorption, and more heat resistant than other materials previously used in the art. In some embodiments, a combination of materials such as HDPE, aluminum, polyoxymethylene (POM), ethylene vinyl alcohol copolymer (EVOH), nylon, polybuthylene terephthalate, polyethylene telephthalate, and/or polyphenylene sulfide are used in the coupling system of the present disclosure.

In accordance with one form of this disclosure, there is provided a method for using a coupling system including the steps of first providing a coupling device including a collar having a first curved opening and a second curved opening disposed diametrically opposite of one another and adapted to structurally engage with a right CAM lever and left CAM lever and a single handle connecting the CAM levers. Then grasping the single handle and rotating the single handle with one hand in an upward rotational movement to unlock the coupling device and rotating the single handle with one hand in a downward rotational movement to lock the coupling device. In another embodiment of the present disclosure, when a user rotates the single handle with one hand in a downward rotational movement to lock the coupling device, a clicking sound is emitted.

Before explaining the various embodiments of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages and the specific objects attained by its uses, reference should be made to the accompanying drawings and descriptive matter in which there are illustrated preferred embodiments of the invention.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale.

The same elements or parts throughout the figures of the drawings are designated by the same reference characters, while equivalent elements bear a prime designation.

DETAILED DESCRIPTION OF THE INVENTION

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1A:
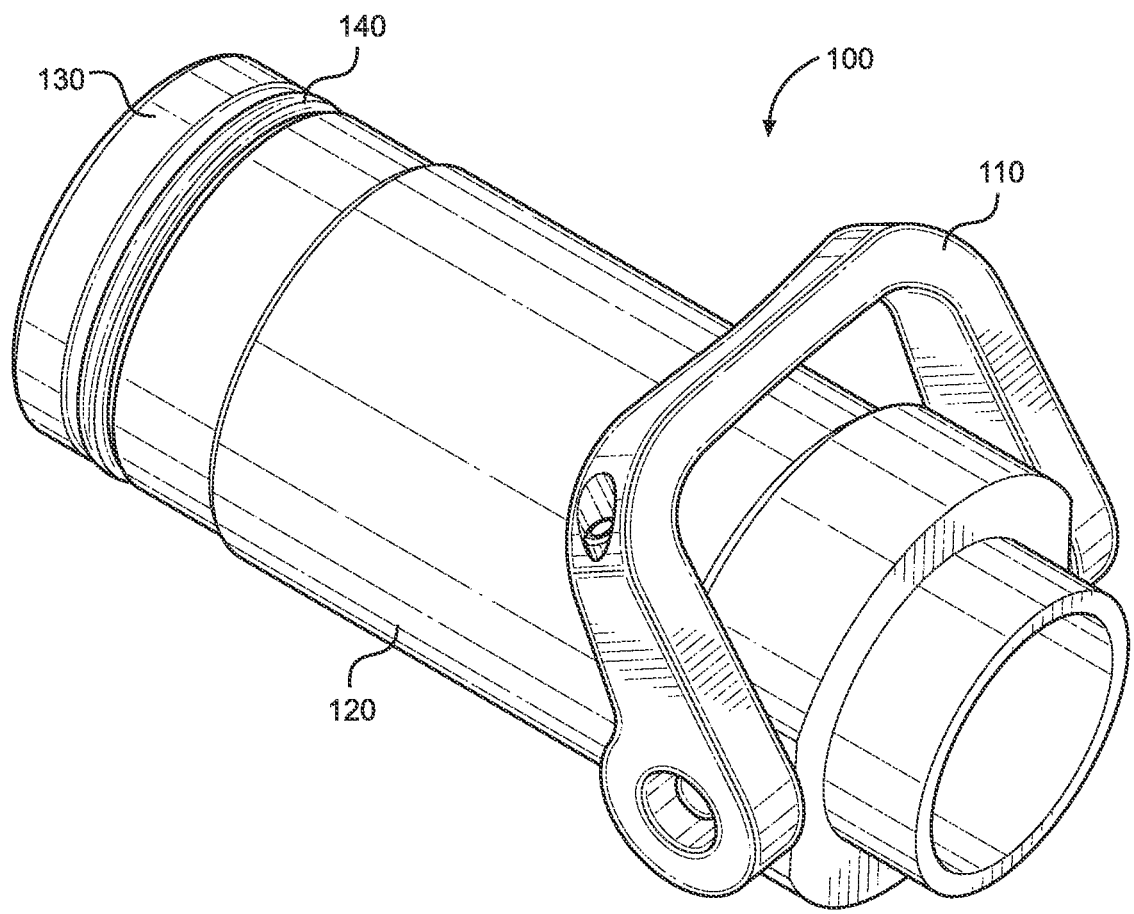
FIG. 1A is a perspective view of one embodiment of the coupling system of the present disclosure.

Referring now to the drawings and the characters of reference marked thereon, FIG. 1A shows a first embodiment of the present disclosure. The Figure shows a coupling system 100 including an inner tube 130 having a generally cylindrical body. A collar 120 is shown here concentrically over the inner tube 130 and also has a generally tubular body. The collar 130 has an inner wall 121 defining a bore which extends axially. The collar's inner wall 121 is adapted for receiving a portion of the inner tube 131. The collar also has a top end 122 and a bottom end 123, and a neck portion 124 which is also a partial protrusion of part of the top end of the collar. The neck portion 124 extends radially outwardly from the collar and includes a first curved opening 170 and a second curved opening 170 placed diametrically opposite of one another on the neck portion.

In one embodiment, the collar includes a first curved opening 125 and 170 and a second curved opening 126 and 170. Each of the first and second curved openings 125, 126 and 170 have a curved opening higher end 172 and a curved opening lower end 174 axially spaced from one another. The coupling system or cooling coupling system 100 includes a circular gasket 140 which concentrically disposed or placed between the inner tube 130 and the collar 120. In a particular embodiment, the circular gasket 140 is an o-ring. The coupling system also includes a right CAM lever 150 and a left CAM lever 150 structurally configured to engage with the curved openings 170 of the collar. Each of the right CAM lever 150 and the left CAM lever 150 have an inner face 156. This inner face has a curved protrusion 160 defining a curved ear 160 protruding outwardly from the inner face 156. Each of the curved ears 160 have an ear higher end 162 and an ear lower end 164 axially spaced apart. A handle 110 connects the right CAM lever 150 to the left CAM lever 150.

In one embodiment, when the ears lower ends 164 abut and touch the collar 120's curved openings lower ends 174, the coupling system 100 is in a locked position 200. And, when the ears higher ends 162 abut and touch the collar's curved opening higher ends 172, the coupling system 100 is in an unlocked position 300. In a particular embodiment, a user can single-handedly move the handle 110 between the locked position 200 and the unlocked position 300.

In one aspect, the present disclosure is embodied as a coupling system having only a single handle such that a user can single handedly lock and unlock the coupling system in a rotational and/or up and down movement. The rotational movement of the handle secures and ensures that a conduit is able to connect/disconnect to a tube conveniently. To do so, the single handle connects a pair of CAM levers together which are in turn attached to a collar. By rotating or moving the handle, the pair of CAM levers engage the collar in an axial movement and allow the coupling system including a collar, an inner tube and a circular gasket to be compressed in a locked position and decompressed in an unlocked position of the system.

Figure 4:
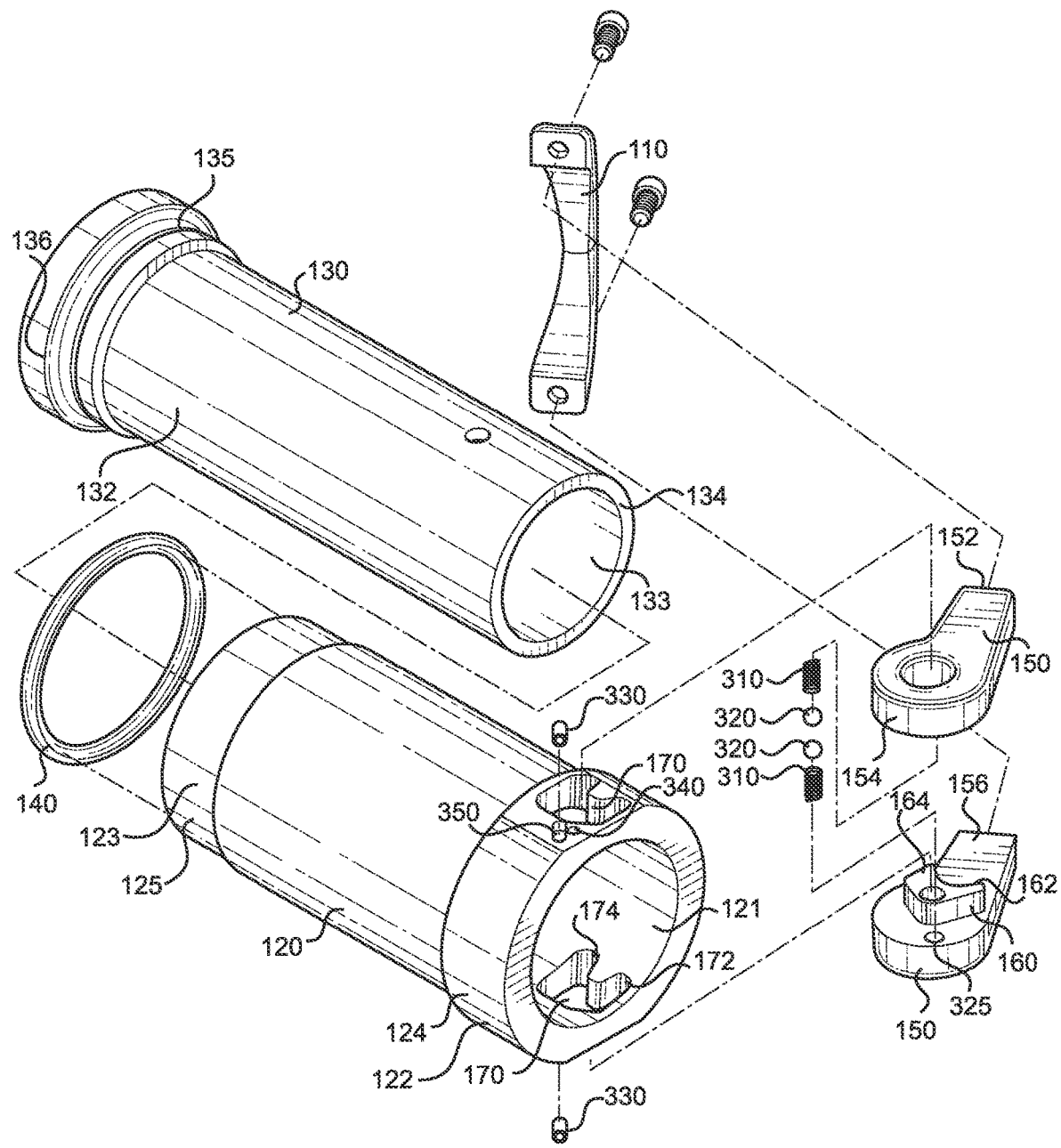
FIG. 4 is an exploded perspective view of the coupling system showing additional elements of one embodiment of the present disclosure.

In one embodiment, the coupling system includes an inner tube having a generally cylindrical body, a collar having a generally tubular body, a circular gasket disposed between the inner tube and the collar as shown in FIG. 4. A pair of CAM levers structurally engageable with a portion of the collar. The pair of CAM levers consist of a right CAM lever and a left CAM lever structurally configured to be engageable with a respective right and left curved openings of the collar. The pair of CAM levers defined as both the left CAM lever and right CAM lever also each include an inner face with a curved protrusion defining a curved ear protruding outwardly from the inner face. Each of the curved ears of the right and left CAM levers has an ear higher end and an ear lower end axially spaced apart. A handle or single handle connects the two CAM levers. When the ears lower ends touch of abut the collar's curved openings lower ends, the coupling system is in a locked position. When the ears higher ends touch or abut the collar's curved opening higher ends, the coupling system is in an unlocked position.

While in some embodiments, the CAM lever inner face curved protrusion defines a curved ear, in other embodiments, the protrusion is an L-shaped or U-shaped protrusion, a V-shaped protrusion or any other polygonal protrusion. In these embodiments, the respective curved openings on the collar mirror the shape of the curved protrusion of the CAM lever's inner faces.

Figure 2A:
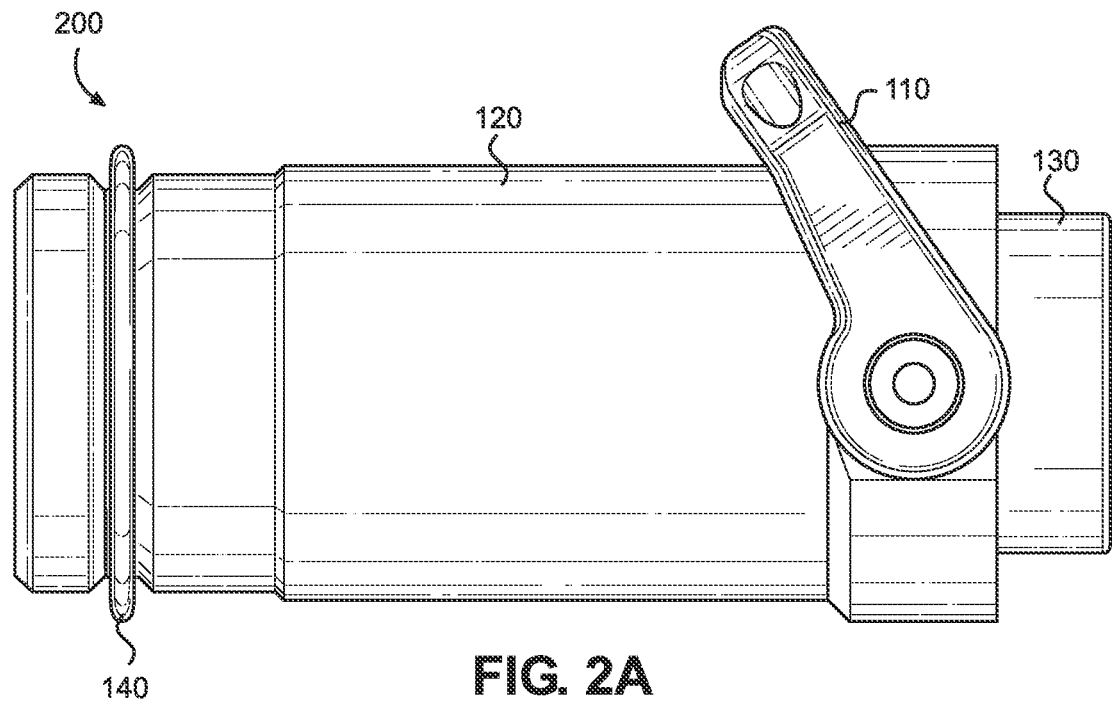
FIG. 2A is a side view of one embodiment of the coupling system of the present disclosure in a locked position.
Figure 2B:
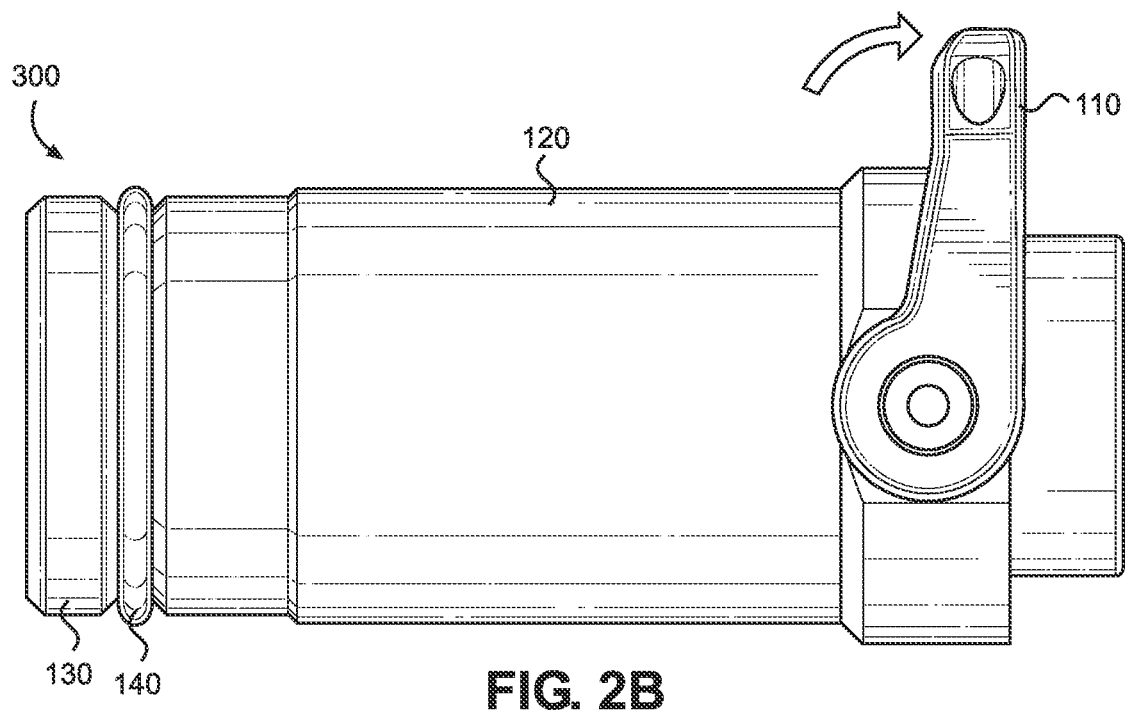
FIG. 2B is a side view of one embodiment of the coupling system of the present disclosure in an unlocked position.

In one embodiment of the present disclosure, a user can single-handedly move the handle between the locked position and the unlocked position without hitting a side of aircraft or other structures it connects to, or to which the coupling system is adapted to attach. A user can also move the handle in an up and down motion, a rotational motion and/or a clockwise and counterclockwise motion and change the coupling system from a locked to an unlocked position by rotating the handle thereby creating axial and/or rotational movement for the rest of the elements of the system, and namely, axial movement of the collar, inner tube and circular gasket. A user can single-handedly move the coupling system 100 between the locked position 200 and the unlocked position 300 by rotating the handle 110 as shown in FIG. 2A and FIG. 2B. In other embodiments such as the one shown in FIG. 5, the user can lock and unlock the coupling system by turning the side knobs of the coupling system. Rotating and turning the knobs in one direction (either clockwise or counterclockwise) will lock the coupling system whereas turning the knobs in the other direction will unlock the coupling system. The handle or knobs can also be moved in a forward and backward motion to lock and unlock the system, or in an up and down movement to lock and unlock the coupling system.

In another embodiment, the CAM levers 150 of the coupling system 100 further include a front end 152 which can be structurally connect the CAM levers to the handle 110 thanks to the CAM Levers front ends. In some embodiments, the CAM levers 150 are bolted to the handle 110 whereas in other embodiments, the CAM levers are snapped into the handle for attachment or any other mechanical coupling allowing secure attachment of the CAM levers to the handle.

Figure 3:
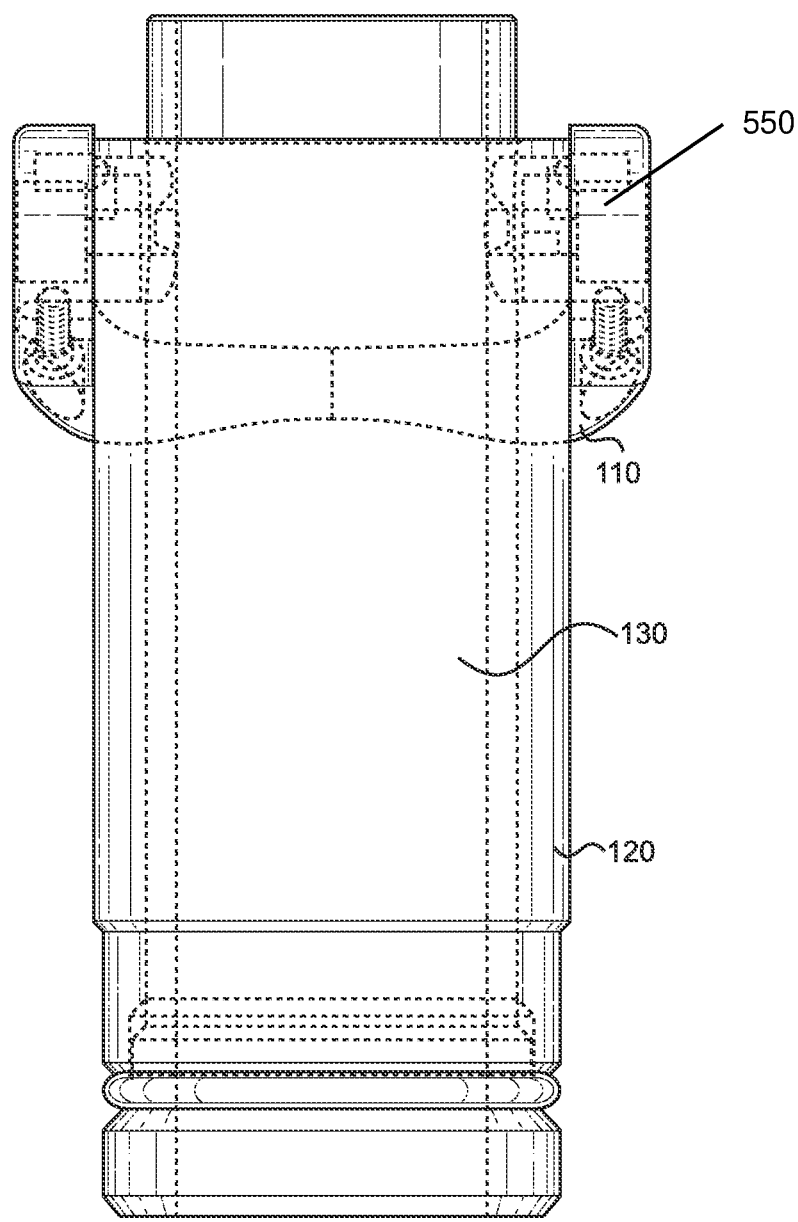
FIG. 3 is a side view of one embodiment of the coupling system of the present disclosure showing the inside of the system.

In one embodiment, the inner tube 130 of the coupling system 100 includes an outer wall 132 and an inner wall 133 defining a bore or a through channel to allow passage of a fluid such as a cooling fluid. The collar also includes an inner wall adapted to receive the portion of the outer wall of the inner tube as shown in FIGS. 1 through 3.

In yet another embodiment, the coupling system 100 also includes a ball 320, a circular opening or indentation 325 disposed on the CAM lever's inner face adapted to receive and fit the ball. The system also has a circular indentation 340 on the neck portion 124 of the collar 120 adapted to receive and fit the ball 320. Such that when the coupling system 100 is in the unlocked position 200, the ball 320 is positioned within the circular opening 325 disposed on the CAM lever's inner face 152. When the coupling system 100 is in the locked position 200, the ball is positioned within the circular indentation 340 of the portion of the collar 120. When the user moves the handle 110 to switch between the unlocked position 300 and the locked position 200, the ball 320 moves from the circular opening disposed 325 on the inner face of the CAM levers onto and rests on the circular indentation 340 disposed on the neck portion of the collar and emits an auditory click confirming that the system 100 is in the locked position 200.

Referring now to FIG. 4, the figure shows an exploded view of one embodiment of the coupling system 100 according to one embodiment of the present disclosure. Here, the system 100 also includes a resistance spring 310 and a pin 330. The circular opening 325 disposed on the CAM lever's inner face 156 now can receive and fit the resistance spring 310 in addition to the ball 320. Here, the system also includes a second indentation 350 disposed on the neck portion 124 of the collar 120 adapted to receive and fit the pin 330. In a particular embodiment, the pin 330 is cylindrical and lays flatly or horizontally on the second indentation 350. In this embodiment, when the coupling system 100 is in the unlocked position 300, the ball 320 is positioned within the circular opening 325 disposed on said CAM lever's inner face 156. And, when the coupling system 100 is in the locked position 200, the ball 320 is positioned within the circular indentation 340 on the neck portion of the collar.

In an another embodiment, when the user moves the handle 110 to switch between the unlocked position 300 and the locked position 200, the ball 320 rides over the pin 330 and rests on the circular indentation disposed on the neck portion of the collar and emits an auditory click to confirm that the system is in the locked position 200.

Figure 1B:
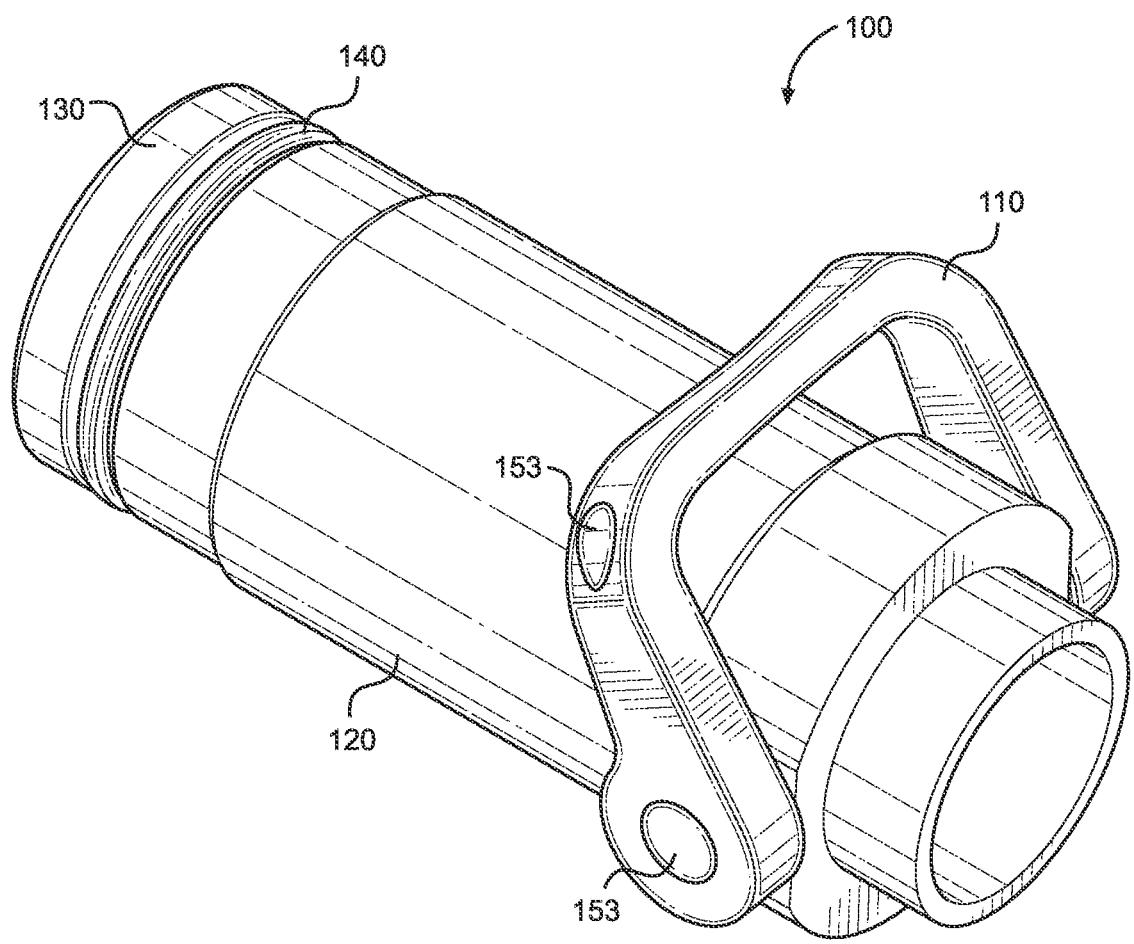
FIG. 1B is a perspective view of another embodiment of the coupling system of the present disclosure.

FIG. 1B shows a coupling system 100 where the handle 110 includes one or more side openings 112. In one embodiment, the system includes caps structurally configured to cover the one or more side openings. The handle can either be formed of one solid component, or multiple subparts attached together to form a single handle. In some embodiments, the handle includes a plurality of side openings. In a particular embodiment where the handle includes a plurality of openings such as a where multiple handle subparts are connected together; the system further includes caps structurally configured to cover the plurality of side openings. This is to reduce the risk of FOD.

As shown in FIG. 1B, this embodiment shows CAM levers including one or more a side opening for where the CAM levers attach to the rest of the system such as where the CAM levers attach to the collar and/or the handle. In a particular embodiment where the CAM levers, the system further includes caps structurally configured to cover the one or more side openings. This is to reduce the risk of FOD.

In one embodiment, the coupling system 100 the first curved opening 170 and the second curved opening 170 on the collar's neck portion 124 also have bushings 550, bearings and/or sleeves to minimize a tear and a wear on the collar. In yet another embodiment, the collar also includes a top end 122 having a top end diameter and a lower end 123 having a lower end diameter and/or a depression 121 on the lower end and has a lower end diameter smaller than the top end diameter.

In yet another embodiment, the inner tube 130 has a top end 134 and a lower end 135, a skirt 136 disposed on the lower end 135 extending radially outwardly, and an inner wall 133 defining a bore adapted for passage of a fluid such as a cooling fluid.

In a particular embodiment, the coupling system 100 has an inner tube 130, a collar 120 and handle 110 all forming a continuous design and a flush design with no hardware exposed which can be seen by a user, all the user can see are the apparent parts including the collar, the inner tube, the handle and the O-Ring, and no part can be readily dissociated from the system, thereby ensuring lesser risk of FOD.

In one embodiment, the inner tube, the collar and/or the handle are formed with a high density polyethylene HDPE, or an HDPE injection molding. HDPE being a more durable, resistant, strong, resistant to moisture absorption, and more heat resistant than other materials previously used in the art. In some embodiments, a combination of materials such as HDPE, aluminum, polyoxymethylene (POM), ethylene vinyl alcohol copolymer (EVOH), nylon, polybuthylene terephthalate, polyethylene telephthalate, and/or polyphenylene sulfide are used in the coupling system of the present disclosure. The higher the density of the polyethylene material used the stronger, more rigid and more heat resistant the plastic is. The higher density models show better properties in tensile strength, chemical and heat resistance, surface hardness and abrasion resistance. HDPE for injection molding works well in both hot and cold temperatures and has a tensile strength of 4550 pounds per inch.

Figure 5:
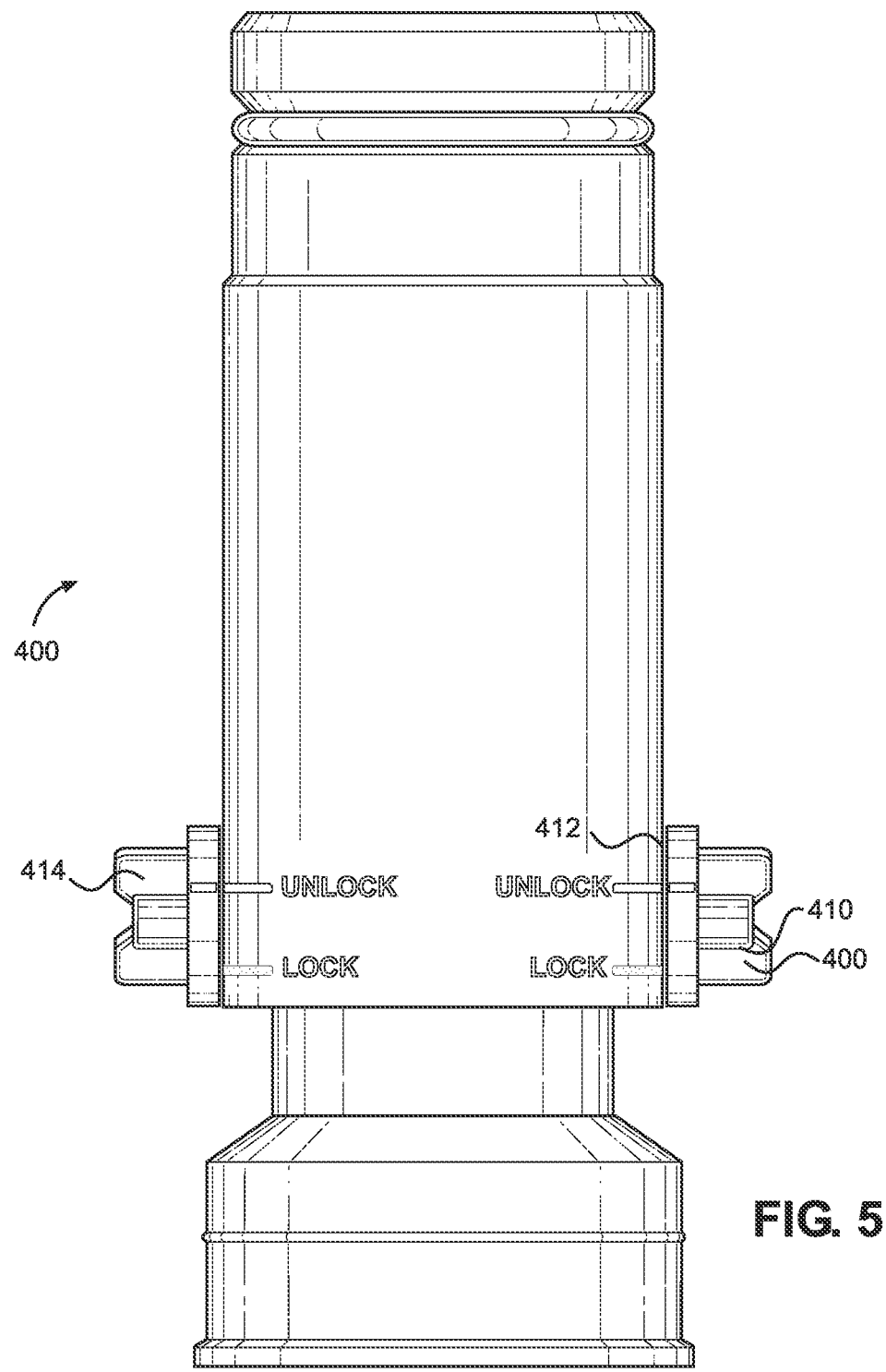
FIG. 5 is a front view of an embodiment of the coupling system of the present disclosure.

FIGS. 4 and 5 show a coupling system which includes a generally cylindrical inner tube and a generally tubular collar. In these embodiments, the collar has an inner wall defining a bore which extends axially and which is adapted to receive a portion of the inner tube. The collar also has a top end and a bottom end, a neck portion disposed on said top end extending radially outwardly. The collar also has a first curved opening and a second curved opening disposed diametrically opposite of one another on the neck portion. The first curved opening and the second curved opening each further include a curved opening higher end and a curved opening lower end spaced axially from one another. In these embodiments, the coupling system also includes a circular gasket concentrically disposed between the inner tube and the collar, and also includes a right CAM lever and a left CAM lever structurally configured to be engageable with the curved openings of the collar. Each of the right and left CAM levers include an inner face with a curved protrusion defining a curved ear protruding outwardly from the inner face. The curved ears have an ear higher end and an ear lower end axially spaced apart. When the ears lower ends abut the collar's curved openings lower ends, the coupling system is in a locked position and when said ears higher ends abut the collar's curved opening higher ends, the coupling system is in an unlocked position.

While in embodiments such as the ones depicted in FIGS. 1 through 4, the right CAM lever and said left CAM lever are connected to one another thanks to a single handle 110, in other embodiments 400 such as the one shown in FIG. 5, the right and left CAM levers terminate in a pair of knobs 410 with dials 414 radially extending outwards from the knob and from the coupling system such that a user can rotate the dials clockwise or counterclockwise to either lock or unlock the coupling system. In other embodiments, not depicted here, the right and left CAM levers have an outer face terminating in a pair of knobs, a pair of switches, a pair of arms, a pair of cranks, a bar, and/or a single handle connecting said right CAM lever and said left CAM lever adapted to move the system between the locked position and the unlocked position. In this embodiment including a handle connecting the right and left CAM levers, a user can single-handedly move the handle to switch between the locked position and the unlocked position of the coupling system.

In one embodiment where the CAM levers terminate in a pair of knobs, the knobs can include one or more side openings and the system further includes caps structurally configured to cover the side openings such as the ones shown in FIG. 1B (153).

In certain embodiments, the coupling system has an auditory clicking mechanism which alerts the user when the coupling system is in the locked position. In some of these embodiments, the coupling system includes a ball, a circular opening disposed on the CAM lever's inner face adapted to receive the ball, a circular indentation disposed on said neck portion of the collar also adapted to receive the ball. The auditory clicking mechanism is such that when the system is in the unlocked position, the ball is positioned within the circular opening disposed on the CAM lever's inner face and when the coupling system is in the locked position, the ball is positioned within the circular indentation of the neck portion of the collar. When the user moves the handle to switch between the unlocked position and the locked position, the ball moves from the circular opening disposed on the inner face of the CAM levers onto and rests on the circular indentation disposed on the neck portion of the collar thereby emitting an auditory click confirming that the system is in the locked position.

In yet another embodiment with auditory clicking mechanism and auditory clicking confirmation, the system also includes a resistance spring, a pin, a circular opening disposed on the CAM lever's inner face further adapted to receive the resistance spring, and a second indentation disposed on the neck portion of the collar adapted to receive the pin. Here, when the coupling system is in the unlocked position, the ball is positioned within the circular opening disposed on the CAM lever's inner face, and when the coupling system is in the locked position, the ball is positioned within the circular indentation on the neck portion of the collar. When the user moves the handle to switch between the unlocked position and the locked position, the ball rides over the pin and rests on the circular indentation disposed on the neck portion of the collar thereby emitting an auditory click confirming that the system is in the locked position.

In one embodiment, the coupling system 100 includes an inner tube, a ball, a collar adapted for receiving a portion of the inner tube which in turn includes a top end and a bottom end, a neck portion disposed on said top end extending radially outwardly and further includes a first curved opening and a second curved opening disposed diametrically opposite of one another on said neck portion. The first curved opening and the second curved opening each further include a curved opening higher end and a curved opening lower end axially spaced from one another, a circular indentation disposed on said collar's neck portion adapted to receive said ball, a circular gasket disposed between said portion of the inner tube and said collar, a right CAM lever and a left CAM lever structurally configured to be engageable with the collar's curved openings and the CAM levers.

Each CAM lever 150 includes an inner face which has a curved protrusion defining a curved ear protruding outwardly from said inner face, said curved ears having an ear higher end and an ear lower end axially spaced apart, a circular opening disposed on said inner face of the CAM levers adapted to receive said ball, a handle 110 connecting said right CAM lever to said left CAM lever.

When the coupling system is in a locked position 200 the curved ears lower ends abut and touch the curved openings lower ends and the ball is positioned in the circular indentation disposed on the neck portion of the collar. When the coupling system is in an unlocked position when the curved ears higher ends abut and touch the curved opening higher ends and the ball is positioned within the circular opening disposed on said inner face of the CAM levers 150. A user can single-handedly move the handle 110 between the locked position 200 and the unlocked position 300.

When the user moves the handle 110 to switch between the unlocked position 300 and the locked position 200, the ball 320 moves from the circular opening disposed on said inner face of the CAM levers onto and rests on said circular indentation disposed on the neck portion of the collar thereby emitting an auditory click confirming that the system is in the locked position.

In some embodiment, the system also has a resistance spring 310 adapted to be positioned within the circular opening disposed on the inner face of the CAM levers adjacent to the ball. The system can also include a pin and a second indentation disposed on the neck portion of the collar adapted to receive said pin.

In yet another embodiment, the coupling system 100 includes a resistance spring adapted to fit inside the circular opening disposed on the inner face of the CAM levers along with the ball, a pin, and a second indentation disposed on the neck portion of the collar adapted to receive the pin. When the user moves the handle to switch between the unlocked position 300 and the locked position 200, the ball 320 moves from the circular opening disposed on the inner face of the CAM levers onto and rests on the circular indentation disposed on the collar's neck portion and rides over the pin thereby emitting an auditory click confirming that the system is in the locked position 200.

The present disclosure is also embodied in a method of using a coupling system 100 including the steps of providing a coupling device including a collar having a first curved opening and a second curved opening disposed diametrically opposite of one another and adapted to structurally engage with a right CAM lever and left CAM lever and a single handle connecting the CAM levers, grasping the single handle, rotating the single handle with one hand in an upward rotational movement to unlock the coupling device, and rotating the single handle with one hand in a downward rotational movement to lock the coupling device. In one particular embodiment, the user can rotate the system with the single handle and with one hand in a downward rotational movement to lock the coupling device until a clicking sound is emitted.

The present disclosure is also embodied in a method of using a coupling system 100 including the steps of providing a coupling device including a right CAM lever and left CAM lever further comprising a single handle or a pair of knobs, rotating the single handle with one hand in an upward rotational movement or rotating said pair of knobs counterclockwise to unlock the coupling device, and rotating the single handle with one hand in a downward rotational movement or rotating said pair of knobs clockwise to lock the coupling device. In some embodiments, the pair of knobs attach to the collar and the collar may include markings on the outer face of the collar such that a user can tell visually whether the knobs are in a locked or an unlocked position. In other embodiments, the pair of knobs is used in conjunction with the spring, indentations and ball thereby emitting an auditory click when the coupling system is in a locked position.

In another embodiment, the method also includes the steps of rotating the single handle with one hand in a downward rotational movement to lock the coupling device until a clicking sound is emitted. In another embodiment, the method also includes the steps of rotating said pair of knobs clockwise to lock the coupling device until a clicking sound is emitted.

As mentioned above, other embodiments and configurations may be devised without departing from the spirit of the invention and the scope of the appended claims.

What is claimed is:

1. A coupling system comprising:
    a) an inner tube having a cylindrical body;
    b) a collar having a tubular body comprising:
        i) a collar inner wall defining a bore which extends axially and receiving an inner tube portion;
        ii) a top end and a bottom end;
        iii) a neck portion disposed on said top end extending radially outwardly
        and further comprising a first curved opening and a second curved opening disposed diametrically opposite of one another on said neck portion;
        iv) the first curved opening and the second curved opening each further including a curved opening higher end and a curved opening lower end axially spaced from one another;
    c) a circular gasket concentrically disposed between said inner tube and said collar;
    d) a right CAM lever and a left CAM lever structurally engageable with the first curved opening and the second curved opening of the collar and each comprising:
        i) an inner face further including a curved protrusion defining a curved ear protruding outwardly from said inner face, said curved ear having an ear higher end and an ear lower end axially spaced apart;
    e) a handle connecting said right CAM lever to said left CAM lever wherein:
        i) when said ears lower ends abuts the curved openings lower ends of the collar, the coupling system is in a locked position;
        ii) when said ear higher end abuts the curved opening higher end of the collar, the coupling system is in an unlocked position; and
        iii) wherein a user can single-handedly move said handle between the locked position and the unlocked position.

2. The coupling system of claim 1, wherein the user can single-handedly move the coupling system between the locked position and the unlocked position by rotating the handle.

3. The coupling system of claim 1, wherein the right CAM lever and the left CAM lever further include a front end and wherein said handle structurally connects to the right CAM lever and the left CAM lever by attaching to said right and left CAM Levers front ends.

4. The coupling system of claim 1, wherein the inner tube further comprises an inner tube outer wall and an inner tube inner wall, and wherein the collar includes a collar inner wall receiving a portion of the inner tube outer wall.

5. The coupling system of claim 1, further comprising:
    a) a ball;
    b) a circular opening disposed on the inner face of said right CAM lever and said left CAM lever receiving said ball;
    c) a circular indentation disposed on said neck portion of the collar adapted to receive said ball;
    d) wherein when the coupling system is in the unlocked position, the ball is positioned within the circular opening disposed on said inner face of the right and left CAM levers; and
    e) wherein when the coupling system is in the locked position, the ball is positioned within the circular indentation of said neck portion of the collar; and
    f) wherein when the user moves said handle to switch between the unlocked position and the locked position, said ball moves from said circular opening disposed on said inner face of the right and left CAM levers onto and rests on said circular indentation disposed on said neck portion of the collar thereby emitting an auditory click confirming that the system is in the locked position.

6. The coupling system of claim 5, further comprising:
    a) a resistance spring;
    b) a pin;
    c) the circular opening disposed on said CAM lever's inner face further receiving said resistance spring;
    d) a second indentation disposed on said neck portion of the collar to structurally receive said pin;
    e) wherein when the coupling system is in the unlocked position, the ball is positioned within the circular opening disposed on said CAM lever's inner face; and f) wherein when the coupling system is in the locked position, the ball is positioned within the circular indentation on said neck portion of the collar; and
g) wherein when the user moves said handle to switch between the unlocked position and the locked position, said ball rides over said pin and rests on said circular indentation disposed on said neck portion of the collar thereby emitting an auditory click confirming that the system is in the locked position.

7. The coupling system of claim 1, wherein at least one of said handle and CAM levers include one or more side openings and wherein the system further comprises caps to structurally cover said one or more side openings.

8. The coupling system of claim 1, wherein the inner tube further comprises:
a) an inner tube top end and an inner tube lower end;
b) a skirt disposed on said inner tube lower end extending radially outwardly; and
c) a channel allowing passage of a fluid.

9. The coupling system of claim 1, wherein the collar further comprises:
a) the top end of having a top end diameter and the bottom end of the collar having a lower end diameter;
b) a depression on said collar lower end having the lower end diameter smaller than the top end diameter.

10. The coupling system of claim 1, wherein at least one of said inner tube, said collar and said handle are formed with a high-density polyethylene injection molding.

11. A coupling system comprising:
a) an inner tube having a cylindrical body;
b) a collar having a tubular body comprising:
   i) a collar inner wall defining a bore which extends axially and receives an inner tube portion;
   ii) a top end and a bottom end;
   iii) a neck portion disposed on said top end extending radially outwardly
   and further comprising a first curved opening and a second curved opening disposed diametrically opposite of one another on said neck portion;
   iv) the first curved opening and the second curved opening each further including a curved opening higher end and a curved opening lower end axially spaced from one another;
c) a circular gasket concentrically disposed between said inner tube and said collar;
d) a right CAM lever and a left CAM lever structurally engageable with the first curved opening and the second curved opening of the collar and each comprising:
   i) an inner face further including a curved protrusion defining a curved ear protruding outwardly from said inner face, said curved ears having an ear higher end and an ear lower end axially spaced apart; and
   ii) wherein when said ears lower ends abut the collar's curved openings lower ends, the coupling system is in a locked position; when said ears higher ends abut the collar's curved opening higher ends, the coupling system is in an unlocked position.

12. The coupling system of claim 11, wherein said right CAM lever and said left CAM lever further comprise an outer face terminating in a pair of knobs, a pair of switches, a pair of arms, a pair of cranks, a bar or a single handle connecting said right CAM lever and said left CAM lever to structurally move the system between the locked position and the unlocked position.

13. The coupling system of claim 12, wherein at least one of said handle, said right CAM lever and said left CAM lever, and said pair of knobs include one or more side openings and wherein the system further comprises caps to structurally cover said one or more side openings.

14. The coupling system of claim 11, further comprising a handle connecting said right CAM lever to said left CAM lever wherein a user can single-handedly move said handle between the locked position and the unlocked position.

15. The coupling system of claim 11, further comprising:
a) a ball;
b) a circular opening disposed on said CAM lever's inner face receiving said ball;
c) a circular indentation disposed on said neck portion of the collar receiving said ball;
d) wherein when the coupling system is in the unlocked position, the ball is positioned within the circular opening disposed on said CAM lever's inner face; and
e) wherein when the coupling system is in the locked position, the ball is positioned within the circular indentation of said neck portion of the collar; and
f) wherein when the user moves said handle to switch between the unlocked position and the locked position, said ball moves from said circular opening disposed on said inner face of the CAM levers onto and rests on said circular indentation disposed on said neck portion of the collar thereby emitting an auditory click confirming that the system is in the locked position.

16. The coupling system of claim 15, further comprising:
a) a resistance spring;
b) a pin;
c) the circular opening disposed on said CAM lever's inner face to further receive said resistance spring;
d) a second indentation disposed on said neck portion of the collar to receive said pin;
e) wherein when the coupling system is in the unlocked position, the ball is positioned within the circular opening disposed on said CAM lever's inner face; and
f) wherein when the coupling system is in the locked position, the ball is positioned within the circular indentation on said neck portion of the collar; and
g) wherein when the user moves said handle to switch between the unlocked position and the locked position, said ball rides over said pin and rests on said circular indentation disposed on said neck portion of the collar thereby emitting an auditory click confirming that the system is in the locked position.

* * * * *